(12) United States Patent
Temple et al.

(10) Patent No.: US 8,085,700 B2
(45) Date of Patent: Dec. 27, 2011

(54) SYSTEM NODE AND METHOD FOR PROVIDING MEDIA ARBITRATION

(75) Inventors: Christopher Temple, Munich (DE); Florian Bogenberger, Munich (DE); Mathias Rausch, Markt Schwaben (DE); Manfred Thanner, Riemerling (DE); Thomas Wuerz, Poing (DE); Leonard Link, Kirchseeon (DE); Gregor Pokorny, Marschallplatz (AT)

(73) Assignee: Freescale Semiconductor, Inc., Austin, TX (US)

(*) Notice: Subject to any disclaimer, the term of this patent is extended or adjusted under 35 U.S.C. 154(b) by 1007 days.

(21) Appl. No.: 10/537,633

(22) PCT Filed: Nov. 21, 2003

(86) PCT No.: PCT/EP03/50868
§ 371 (c)(1),
(2), (4) Date: Jun. 3, 2005

(87) PCT Pub. No.: WO2004/051925
PCT Pub. Date: Jun. 17, 2004

(65) Prior Publication Data
US 2006/0045133 A1    Mar. 2, 2006

(30) Foreign Application Priority Data
Dec. 3, 2002 (GB) .................... 0228144.2

(51) Int. Cl.
*H04W 4/00* (2009.01)
*H04B 7/212* (2006.01)
*H04J 3/08* (2006.01)
*H04J 3/00* (2006.01)
*H04L 12/43* (2006.01)

(52) U.S. Cl. ........ 370/314; 370/321; 370/326; 370/336; 370/345; 370/458

(58) Field of Classification Search ............ 370/394
See application file for complete search history.

(56) References Cited

U.S. PATENT DOCUMENTS
5,267,243 A * 11/1993 Sarraf .......................... 370/458
(Continued)

FOREIGN PATENT DOCUMENTS
EP        1355456 A       10/2003

OTHER PUBLICATIONS

Berwanger et al, "Flexray—The Communication System for Advanced Automotive Control Systems" SAE Technical Paper Series, Society of Automotive Engineers, Warrendale, PA, USA vol. 2001-1.676; Mar. 2001.

(Continued)

*Primary Examiner* — Andrew Chriss

(57) ABSTRACT

A multi-node communications system is provided with communications protocol using both static (11, 12, 13, 18) (predetermined) and dynamic (51, 52, 53 . . . ) (run-time determined) consecutive communication slots is used. The system has a number of distributed communication nodes, each node being arranged for communicating frames of data with the other nodes during both the static (11, 12, 13 . . . ) and the dynamic (51, 52, 53 . . . ) communication slots. Each node includes a synchronized time base 5 made up of consecutive timeslots (11, 12, 13 . . . , 51, 52, 53 . . . ). The timebase 5 has substantially the same error tolerance in each node. For static communication (10), a predetermined number of timeslots (20) are utilized for each static communication slot. For dynamic communication a dynamically allocated number of timeslots (60) are utilized for each dynamic communication slot. In this way both static and dynamic media arbitration is provided within a periodically recurring communication pattern. Communication jitter is well defined and dealt with, and large oscillator drifts are compensated for.

20 Claims, 3 Drawing Sheets

U.S. PATENT DOCUMENTS

| | | | |
|---|---|---|---|
| 5,537,549 A * | 7/1996 | Gee et al. | 709/224 |
| 5,729,538 A | 3/1998 | Dent | |
| 5,771,234 A * | 6/1998 | Wu et al. | 370/396 |
| 6,091,717 A * | 7/2000 | Honkasalo et al. | 370/329 |
| 6,434,154 B1 * | 8/2002 | Stacey et al. | 370/395.64 |
| 2002/0126692 A1 * | 9/2002 | Haartsen | 370/450 |
| 2003/0142630 A1 * | 7/2003 | Budde et al. | 370/251 |

OTHER PUBLICATIONS

Peller et al, "byteflight specification Version 0.5 Draft", BMW AG, Oct. 1999.

Kopetz, "A Comparison of TTP/C and Flexray" www.informatik.uni-ulm.de/rs/projekte/core/rtsl/, May 9, 2001.

Belschner et al, "Flexray Requirements Specifications", BMW AG, May 16, 2002.

Great Britain Appl. No. GB 0228144.2, Office Action, combined search exam report, dated Apr. 29, 2003, relating to U.S. Appl. No. 10/537,633.

PCT International Search Report, PCT/EP03/50868, dated May 28, 2004, relating to U.S. Appl. No. 10/537,633.

China Office Action, Non-Final Rejection, Application No. 200380105049.3, dated Feb. 18, 2008, relating to U.S. Appl. No. 10/537,633.

* cited by examiner

SYSTEM NODE AND METHOD FOR PROVIDING MEDIA ARBITRATION

FIELD OF THE INVENTION

The invention relates to communication protocols for multi-node distributed communication systems, and particularly (though not exclusively) to such protocols for use in automotive applications.

BACKGROUND OF THE INVENTION

In the field of communication protocols for multi-node wired communication systems in automotive applications, two existing protocols are well known: TTP/C (Time-Triggered communication Protocol for safety-Critical distributed real-time control systems) and byteflight (a protocol for safety-critical applications in automotive vehicles, combining time and priority controlled bus access).

FlexRay, a presently evolving communication protocol, is specified to use a TDMA (Time Division Multiple Access) scheme for the static segment and a FTDMA (Flexible Time-Division, Multiple-Access) arrangement such as byteflight for the dynamic segment. The FlexRay protocol requires that the following Media Access Scheme (MAS) requirements are met:

MAS 1: Under fault-free conditions the media arbitration scheme shall allow for both static (pre-scheduled) and dynamic (run-time determined) media arbitration.

MAS 2: The arbitration scheme shall be based on a periodically recurring principle.

MAS 3: The arbitration scheme shall implement a collision avoidance principle (assuming fault-free subscribers).

MAS 4: The arbitration scheme shall allow large oscillator drifts per subscriber over the lifetime of the system.

Therefore at present there is no known arrangement which will satisfy all of the MAS requirements of FlexRay.

A need therefore exists for a system, node and method for providing media arbitration wherein the abovementioned disadvantage(s) may be alleviated.

STATEMENT OF INVENTION

In accordance with a first aspect of the present invention there is provided a system for providing media arbitration as claimed in claim 1.

In accordance with a second aspect of the present invention there is provided a node as claimed in claim 2.

In accordance with a third aspect of the present invention there is provided a method for providing media arbitration as claimed in claim 3.

Preferably the communication slots include static communication slots. A predetermined number of timeslots are preferably utilised for each static communication slot.

The communication slots include dynamic communication slots. Preferably a dynamically allocated number of timeslots are utilised for each dynamic communication slot.

Each dynamic communication slot in which frame transmission takes place is preferably divided into alternating matching and mismatching time slots, the matching time slots being valid transmission slots.

In this way a system, node and method are provided for media arbitration within a periodically recurring communication pattern. Communication jitter is well defined and dealt with, and large oscillator drifts are substantially compensated for.

BRIEF DESCRIPTION OF THE DRAWINGS

One a system, node and method for providing media arbitration incorporating the present invention will now be described, by way of example only, with reference to the accompanying drawing(s), in which.

DESCRIPTION OF PREFERRED EMBODIMENT(S)

A multi-node wired communications system (not shown) such as a 'brake-by-wire' system in an automobile, comprises a number of nodes, each of which is arranged to send and receive data to and from the other nodes of the system.

A node (not shown) of the present embodiment has access to two time bases of different granularity. A time base of high granularity may be defined in terms of microticks. The microtick defines a time base that is unsynchronised in both phase and frequency among different nodes. The second time base, which is of low granularity, is defined in terms of macroticks. The macrotick defines a timebase that is synchronized in both phase and frequency within a precision p among all synchronized nodes. The macrotick consists of multiple microticks and satisfies the condition that its duration is greater than the precision p. A synchronization approach that satisfies this assumption is disclosed, for example for FlexRay, in European Patent EP 22116573.

Media arbitration distinguishes between two distinct phases: the initial unsynchronized startup phase and the subsequent synchronized operation phase. The two phases differ as follows:

- during the initial startup phase the node has no knowledge of the system wide synchronized time, i.e. the macrotick time base is not established.
- during the synchronized operation phase the node has knowledge of the system wide synchronized time, i.e. the macrotick time base is established.

During the unsynchronised startup phase media arbitration is not required for one of two reasons. Firstly, the node may be integrating into an already operational cluster, in which case a first transmission does not occur until the node is in synchronized operation phase. Secondly, the cluster may not be operational, in which case no other sender is present, i.e. no arbitration of the media is required.

Figure 1:
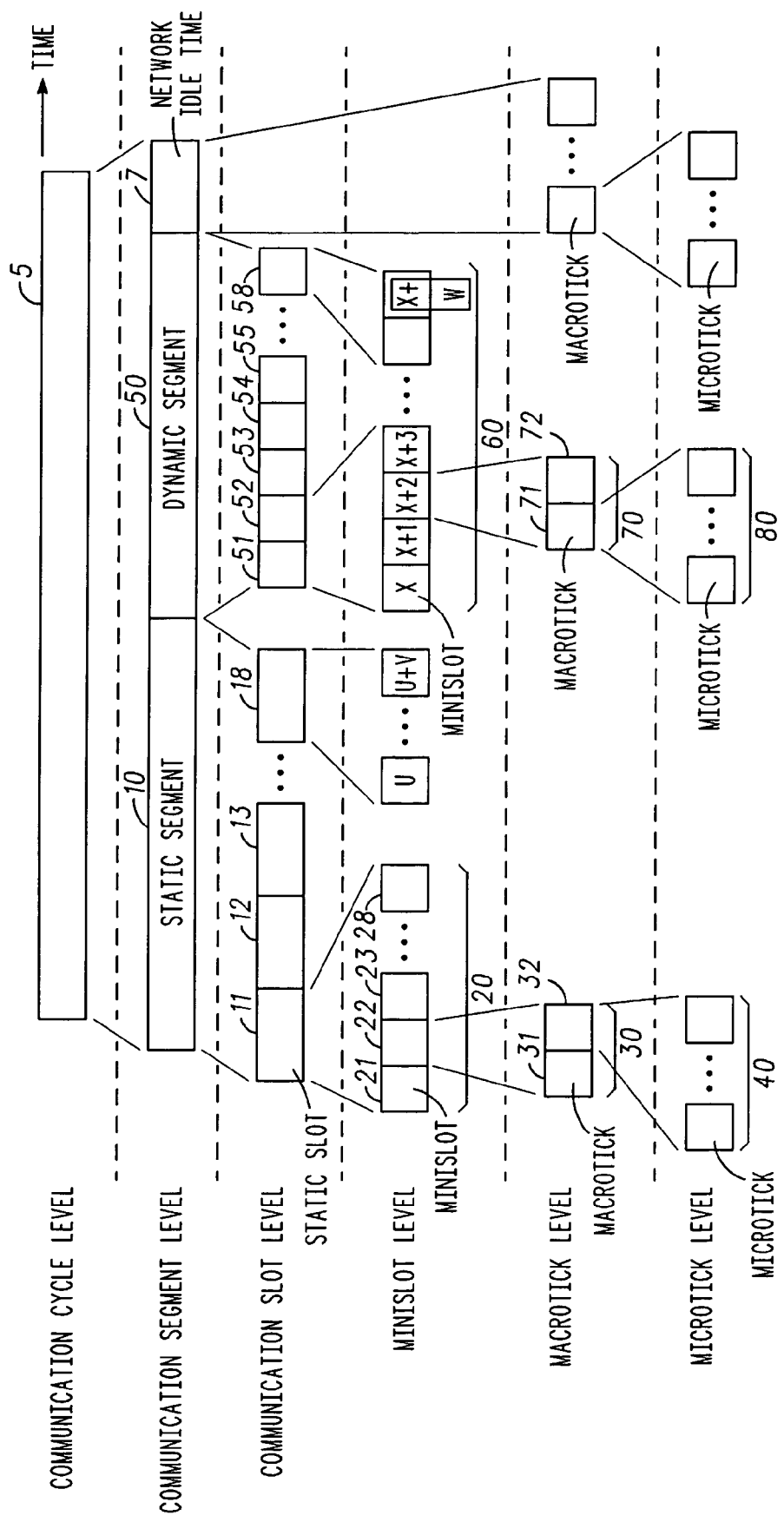
FIG. 1 shows a composite timing diagram illustrating a timing hierarchy of the present invention.

Referring now to FIG. 1, there is shown a composite timing diagram of a timing hierarchy according to the present embodiment. In order to meet requirement 'MAS 2' (that the arbitration scheme shall be based on a periodically recurring principle), transmission within the synchronized operation phase occurs within a temporally recurring communication cycle 5.

The communication cycle 5 is in effect a timebase which is shared across all nodes of the system. The timebase has substantially the same error tolerance in each node.

The communication cycle 5 consists of a communication period (CP) made up of two segments: a static segment 10 and a dynamic segment 50 (during which transmissions may take place), and an optional traffic-free period, the network idle time (NIT) 7. The static and dynamic segments 10 and 50 respectively satisfy the requirement of MAS1 (the provision of static and dynamic media arbitration).

The static segment 10 is subdivided into a number of static slots illustrated in FIG. 1 by static slots 11, 12, 13, 18.

Each of the static slots 11, 12, 13, 18 is made up of a set of consecutive time intervals, called minislots. For example, the static slot 11 is made up of a set 20 of minislots, including minislots 21, 22, 23 and 28. Each static slot has the same number (v) of minislots. The minislots define a temporal grid that serves as a basis for the media arbitration, to be further described below.

Each minislot consists of a set of at least two macroticks. By way of example, minislot 22 comprises a set 30 of macroticks, including macroticks 31 and 32.

Each macrotick comprises a set of microticks. For example, the macrotick 32 comprises the set 40 of microticks.

The dynamic segment 50 is subdivided into a number of dynamic slots illustrated in FIG. 1 by dynamic slots 51, 52, 53, 58.

Each of the dynamic slots 51, 52, 53, 58 is made up of a number of minislots of a set 60 of minislots.

However, unlike the static slots, each of the dynamic slots may be a different length, so may be made up of a different number of minislots. The dynamic slot 51 is made up of minislots 61 and 62 in this example, but the number of minislots used by each dynamic slot is dynamically allocated in a manner to be further described below.

As described above with respect to the static segment 10, each minislot of the dynamic segment 50 consists of a set of at least two macroticks. By way of example, minislot 63 comprises a set 70 of macroticks, including macroticks 71 and 72.

Each macrotick comprises a set of microticks. For example, the macrotick 71 comprises the set 80 of microticks.

It will be appreciated that the set of microticks 80 are part of the same timing framework as the set of microticks 40 as are all microticks of the system, and similarly the set of macroticks 30 are part of the same timing framework as the set of macroticks 70 as are all macroticks of the system.

All minislots consist of an equal number of macroticks. A dedicated instant within each minislot is called the minislot action point.

The minislot action point coincides with the boundary of two subsequent macroticks within the minislot.

Arbitration in both segments is performed by means of frame priorities and a slot counting scheme. Unique frame priorities, referred to as frame identifiers starting with 1 are distributed among the nodes. The frame identifier determines when a frame will be sent within the communication phase. Each node maintains a slot counter that is initialised with 1 at the start of each communication cycle.

Figure 2:
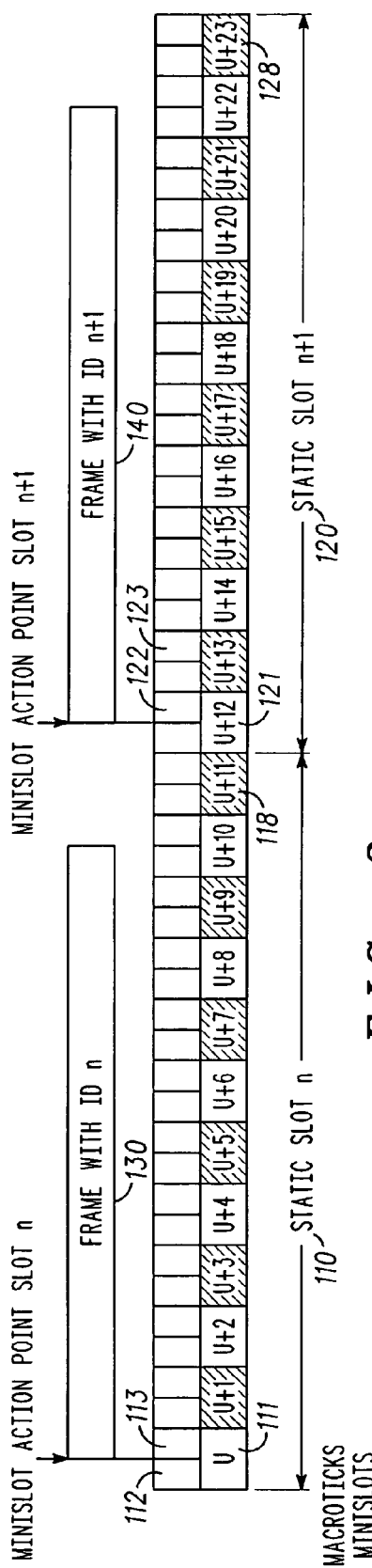
FIG. 2 shows a timing diagram illustrating a structure and arbitration of a static segment of the timing hierarchy of FIG. 1.

Referring now to FIG. 2 there is shown the timing structure and the arbitration principle of a static segment such as the static segment 10 of FIG. 1.

A unique slot ID ranging from 1 to g (total number of static slots) is assigned to every static slot of the static segment. A first slot 110 has the number n, and a second, consecutive slot 120 has the number n+1. All static communication slots are of equal duration, this being the chosen integral number of minislots, multiplied by the minislot duration. In the example of FIG. 2, the first slot has 12 minislots, from slot 111 (u) to slot 118 (u+11) and the second slot has 12 minislots, from slot 121 (u+12) to slot 128 (u+23). The duration of a static slot is chosen such that the static slot always accommodates the transmission of the frame associated with it through the slot ID/frame ID relationship.

Frame transmission occurs if the slot counter equals the frame identifier of a frame to send. In the example of FIG. 2 the first frame 130 having frame ID n, will be transmitted during the first static slot 110, and the second frame 140 having frame ID n+1, will be transmitted during the second static slot 120.

Frame transmission starts at the minislot action point within the first minislot of the respective static slot. Therefore the frame transmission of the first frame 130 starts at the minislot action point of minislot 111 (that being the transition between microticks 112 and 113 respectively). Similarly the frame transmission of the second frame 140 starts at the minislot action point of minislot 121 (that being the transition between microticks 122 and 123 respectively).

At the end of every static slot the slot counter is incremented by one. As the advancement of the slot counter occurs independently from whether and from when access to the media takes place, arbitration in the static segment is robust against communication faults in the sense that any disturbance within a slot will not impact arbitration within unaffected slots.

Figure 3:
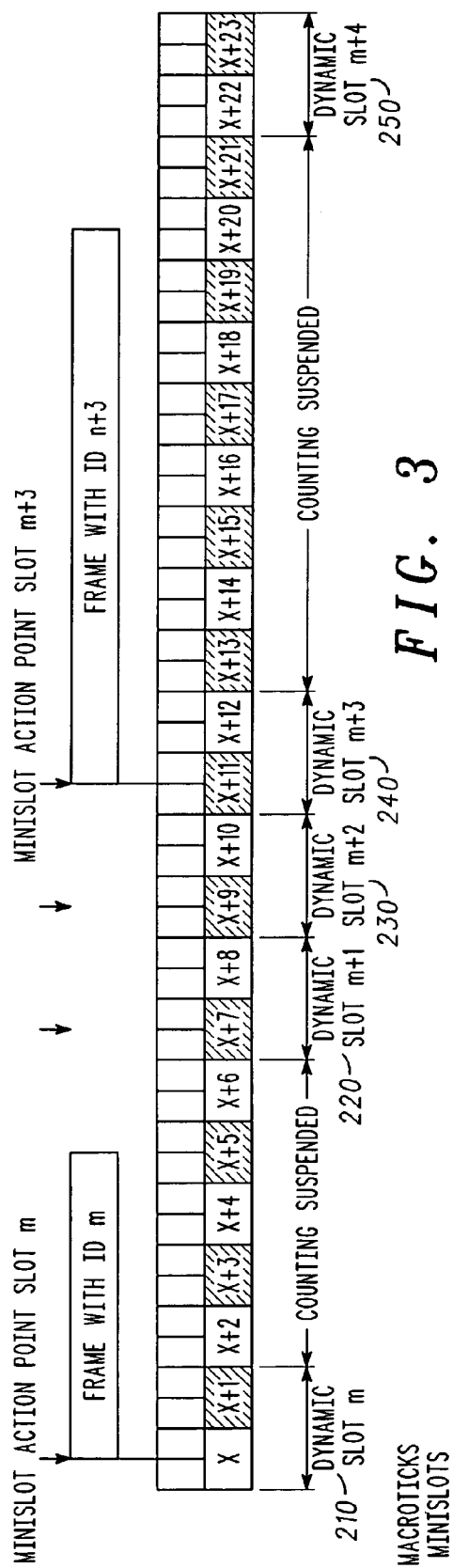
FIG. 3 shows a timing diagram illustrating a structure of a dynamic segment of the timing hierarchy of FIG. 1 along with the arbitration principle.

Referring now also to FIG. 3, there is shown a timing diagram illustrating the structure of a dynamic segment and associated arbitration principle.

The dynamic segment is subdivided into a number of dynamic communication slots. A first dynamic slot 210 has number m, a second, consecutive slot 220 has number m+1.

Similarly third, fourth and fifth slots 230, 240 and 250 have numbers m+2, m+3 and m+4 respectively.

Each dynamic slot consists of at least one minislot. The exact number depends on the type of faults for which collision free recovery should be assured: one minislot for fault-free assumption and two minislots for single transmission related faults.

As with the static scenario described above, frame transmission occurs if the slot counter equals the frame identifier of a frame to send. Once again frame transmission starts at the minislot action point within the first minislot of the respective dynamic slot. However unlike the static case, frame transmission must also end at a minislot action point. If the frame would not otherwise end at a minislot action point by virtue of its data length, then the transmitter must extend the transmission by producing a busy signal. This prevents premature idle detection by the receivers.

At the end of every dynamic slot in which no message transmission or reception occurs, the slot counter is incremented by one, i.e. while a message is being transmitted or received the process of incrementing the slot counter is suspended.

By virtue of the procedure all fault-free receivers agree implicitly on the dynamic slot, in which the transmission takes place, i.e. the slot counter of all fault-free receivers matches the slot counter of the fault-free sender and the frame ID value transmitted in the frame.

In order to handle faults the dynamic slots must each consist of (at least) two minislots. The first minislot may be termed a matching minislot and the second minislot may be termed a mismatching minislot. Furthermore the minislot action point of the first minislot is called the minislot match action point, the minislot action point of the second minislot is called the minislot mismatch action point. According to the above rules frame transmission starts at the minislot match action point and ends at a minislot action point (either match or mismatch).

Two types of faults are of interest:
a) the start of a reception (frame or noise) does not align to a minislot action point, and,
b) the end of a reception does not align to a minislot action point.

For the fault a) above, if frame reception starts in the matching minislot (that is a minislot having a matching action point) then the receiver is aligned with the transmitter and no slot correction is required. However if frame reception starts in a mismatching minislot (a minislot having a mismatching action point) then the receiver has to adjust its minislot phase relationship to match the transmitter. In order to do this it is necessary to evaluate the frame ID contained in the frame being received, in order to know whether to retard by one minislot to the previous matching minislot or to advance by one minislot to the next matching minislot.

Figure 4:
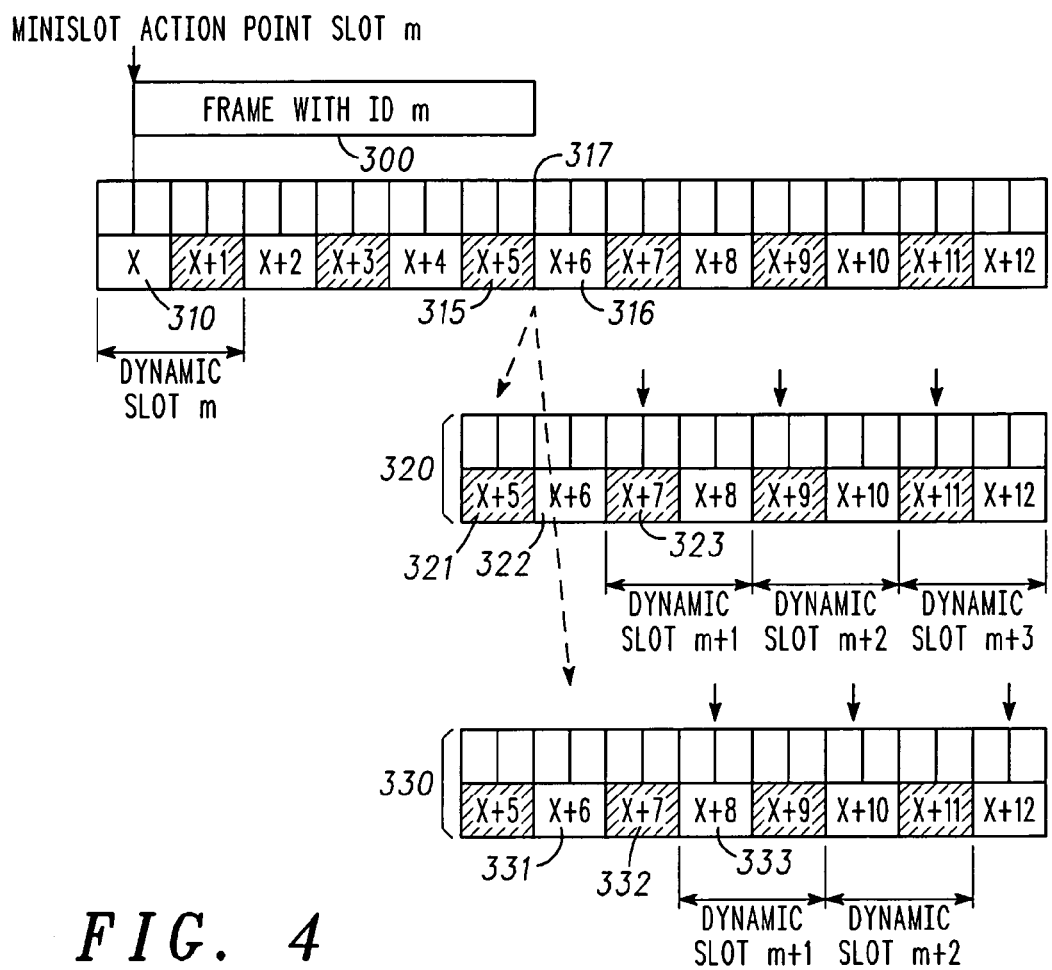
FIG. 4 shows a composite timing diagram illustrating the procedure for handling symmetric faults.

Referring now also to FIG. 4 there is shown a composite timing diagram illustrating the handling of fault b) above, namely that the end of frame reception does not align to a minislot action point. A frame 300 with frame ID m starts at the minislot action point of the first minislot x of dynamic slot m (labelled 310). The end of frame 300 coincides with a minislot boundary 317 which occurs at the end of minislot x+5 (labelled 315) and start of minislot x+6 (labelled 316).

Since the end of reception of a frame may occur in either a matching or mismatching minislot, where a frame ends at a minislot boundary as in the boundary 317 of FIG. 4, it is unclear which one of minislots 315 and 316 is to be treated to be the minislot in which the frame has ended. As will be appreciated for a dynamic segment, this leads to ambiguity over where the next dynamic slot (slot m+1) will start.

One group of nodes may assume that the frame 300 has ended in minislot 315 (x+5), whereupon this group of nodes adopts the timeline 320. According to the timeline 320, since the frame 300 has ended in minislot x+5 (labelled 321 in timeline 320), there will follow empty minislot x+6 (labelled 322) before the next dynamic slot (slot m+1) commences at matching minislot x+7 (labelled 323).

Another group of nodes may assume that the frame 300 has ended in minislot 316 (x+6), whereupon this group of nodes adopts the timeline 330. According to the timeline 330, since the frame 300 has ended in minislot x+6 (labelled 331 in timeline 320), there will follow empty minislot x+7 (labelled 332) before the next dynamic slot (slot m+1) commences at matching minislot x+8 (labelled 333).

Despite the possible existence of two timing regimes operating within the nodes, namely one group operating according to the timeline 320 and another group operating according to the timeline 330, there are no collisions or arbitration problems, either intra-group or inter-group.

The two timing regimes 320 and 330 will be resolved across all nodes when the next frame is transmitted. If the node which sends the next frame is operating according to the timeline 320, then upon transmission, all nodes using the timeline 320 will recognise commencement of a frame in a matching slot, and will take no action. All nodes using the timeline 330 will notice commencement of a frame in a mismatching slot and will take the appropriate action detailed for fault a) above to rectify this problem, whereupon all nodes of the system will be resolved to the timeline 320.

In a similar way, if the node which sends the next frame is operating according to the timeline 330, then upon transmission, all nodes using the timeline 330 will take no action and all nodes using the timeline 320 will take the appropriate action detailed for fault a) above, whereupon all nodes of the system will be resolved to the timeline 330.

It will be understood by a person skilled in the art that alternative embodiments to those described above are possible. For example, the number of slots, minislots and macroticks associated with each segment may differ from those described above.

Furthermore the minislot action points described above need not occur at the boundary between the first and second macroticks of each minislot, but for example they may be arranged to occur between second and third macroticks in a minislot having at least three macroticks.

It will be understood that the method for collision free combined static and dynamic media arbitration based on a system wide synchronized time base described above provides the following advantages:
provides a closed concept for both static (pre-scheduled) and dynamic (run-time determined) media arbitration,
provides a periodically recurring communication pattern,
provides bounded and deterministic communication jitter, and
is capable of compensating large oscillator drifts.

The invention claimed is:

1. A communications system for providing media arbitration via a communications protocol using consecutive communication slots, the system comprising:
a plurality of communication nodes, each node being arranged to communicate frames of data with other nodes of the plurality of communication nodes during a dynamic section associated with communication of dynamic communication slots, and each dynamic communication slot having a communication slot number; wherein
each of the plurality of communication nodes is arranged to communicate, in accordance with a time base comprising consecutively elapsing time slots, each consecutive time slot of the base comprising at least two elapsing sub-time slots and a transmission action point located at a boundary between two of the at least two sub-time slots; wherein the each of the plurality of communication nodes is arranged to start and end, transmission of each frame of data at the transmission action point associated with the time base; and
a counter arranged to determine a communication slot number operable to:
increment the communication slot number in response to determining, at the end of a dynamic communication slot, that no message has been transmitted or received at a first node during the dynamic communication slot; and
to suspend incrementing of the communication slot number in response to determining, at the end of the dynamic communication slot, that a message has been transmitted or received at the first node during the dynamic communication slot.

2. The system of claim 1, wherein the time base is associated with static communication slots.

3. The system of claim 2, wherein a predetermined number of timeslots are utilised in respect of each static communication slot.

4. The system claim 1, wherein a dynamically allocated number of timeslots are utilised in respect of each dynamic communication slot.

5. The system of claim 4, wherein each dynamic communication slot in which frame transmission takes place is divided into alternating matching and mismatching time slots, the matching time slots being valid transmission slots.

6. The system of claim 1, wherein each node comprises a receiver to set a current communication slot number in response to whether a communication start is detected in a matching or mismatching time slot.

7. The system of claim 1, wherein each node has an associated communication slot number and is operable not to transmit in dynamic communication slots having communication slot numbers different than the associated communication slot number.

8. The system of claim 1, wherein each node comprises a transmitter to extend a transmission to a transmission action point.

9. The system of claim 8, wherein the transmission is by transmission of a busy signal.

10. The system of claim 1, wherein each node comprises a receiver to adjust the time base in response to a frame identity of a frame being communicated in a dynamic communication slot.

11. A communication node for use with a multi-node distributed communications system utilising a communications protocol using consecutive communication slots, the node being arranged to communicate frames of data with other nodes of the system during a dynamic section associated with communication of dynamic communication slots, and each dynamic communication slot having a communication slot number; wherein
the node is arranged to communicate, in accordance with a time base comprising consecutively elapsing time slots, each consecutive time unit of the time base comprising at least two elapsing sub-time slots and a transmission action point located at a boundary between two of the at least two sub-time slots;
the node is also arranged to start and end transmission, of each frame of data at the transmission action point associated with the time base; and
the node comprises a counter arranged to determine the communication slot number, the counter operable to:
increment a communication slot in response to determining, at the end of a dynamic communication slot, that no message has been transmitted or received at a first node during the dynamic communication slot; and
suspend incrementing of the communication slot number in response to determining, at the end of the dynamic communication slot, that a message has been transmitted or received at the first node during the dynamic communication slot.

12. A method for providing media arbitration in a multi-node distributed communications system via a communications protocol using consecutive communication slots, the method comprising:
each node of the system communicating frames of data with the other nodes during a dynamic section associated with the dynamic communication slots, each dynamic communication slot having a communication slot number;
providing a system wide time base comprising consecutively elapsing time slots, each consecutive time slot of the time base comprising at least two elapsing sub-time slots and a transmission action point located at a boundary between two of the at least two sub-time slots and the transmission of each frame of data starts and ends at the transmission action point; and
each communication node determining the communication slot number by incrementing the communication slot number if no frame of data has been communicated during a dynamic communication slot and suspending incrementing of the communication slot number if a frame of data has been communicated during the dynamic communication slot.

13. The method of claim 12, wherein the time base is associated with static communication slots.

14. The method of claim 13, wherein a predetermined number of timeslots are utilised in respect of each static communication slot.

15. The method of claim 12, wherein a dynamically allocated number of timeslots are utilised in respect of each dynamic communication slot.

16. The method of claim 15, wherein each dynamic communication slot in which frame transmission takes place is divided into alternating matching and mismatching time slots, the matching time slots being valid transmission slots.

17. The method of claim 12, further comprising:
setting a current communication slot number in response to whether a communication start is detected in a matching or mismatching time slot.

18. The method of claim 12, wherein each node has an associated communication slot number and is operable not to transmit in dynamic communication slots having communication slot numbers different than the associated communication slot number.

19. The method of claim 12, further comprising:
extending a transmission to a transmission action point.

20. The method of claim 19, wherein the transmission is by transmission of a busy signal.

* * * * *